United States Patent [19]
Saneii et al.

[11] Patent Number: 5,746,982
[45] Date of Patent: May 5, 1998

[54] APPARATUS FOR AUTOMATED SYNTHESIS OF CHEMICAL COMPOUNDS

[75] Inventors: Hossain Saneii; Mohammad R. Boroomand; Michael R. Ferriell, all of Louisville, Ky.

[73] Assignee: Advanced ChemTech, Inc., Louisville, Ky.

[21] Appl. No.: 609,968

[22] Filed: Feb. 29, 1996

[51] Int. Cl.$^6$ ............................... C08F 2/02; B01J 14/00
[52] U.S. Cl. .......................... 422/134; 422/138; 422/149; 422/189; 422/196
[58] Field of Search ..................... 422/131, 134, 422/138, 149, 188, 189, 193, 196, 197, 206, 208

[56] References Cited

U.S. PATENT DOCUMENTS

| | | | |
|---|---|---|---|
| 3,787,187 | 1/1974 | DeWitt | 422/131 |
| 3,819,332 | 6/1974 | Jaccard et al. | 422/134 |
| 3,944,538 | 3/1976 | Bodanszky | 422/138 |
| 4,476,918 | 10/1984 | Kesten | 422/149 |
| 4,559,202 | 12/1985 | Leutzelschwab | 422/134 |
| 4,668,476 | 5/1987 | Bridgham et al. | 422/134 |
| 4,746,490 | 5/1988 | Saneii | 422/189 |
| 4,816,513 | 3/1989 | Bridgham et al. | 422/134 |
| 5,503,805 | 4/1996 | Sugarman et al. | 422/131 |
| 5,609,826 | 3/1997 | Cargill et al. | 422/196 |

Primary Examiner—Thomas G. Wyse
Attorney, Agent, or Firm—John E. Vanderburgh

[57] ABSTRACT

Apparatus for the synthesis of chemical compounds consists of a housing having a top, front, side and rear walls surrounding and enclosing a reaction table. A track on the rear wall of the housing carries a pair of extending arms on each of which is movably mounted a vertically extendible probe for positioning at various locations over the reaction table. At least on control syringe communicates between the probe and containers for system fluids. A programmable controller is provided for control of the syringe and probes. A reaction block on the reaction table consists of a body having an upper portion and a lower portion and an upper and lower surface and a multiplicity of reaction wells for carrying out the synthesis. Each reaction well is closed at its lower end and open to the upper surface. A flushing conduit is located adjacent each of the well and is in fluid communication with the closed lower end of the reaction well. A manifold section is in fluid communication with the flushing conduit for leading fluid into and out of the body responsive to the creation of a pressure differential between the reaction well and the manifold section. The pressure in the reaction well is greater than that in the manifold section during the flushing of the well. A heating and cooling module may be attached to the reaction block for controlling the temperature of the reaction wells.

27 Claims, 6 Drawing Sheets

APPARATUS FOR AUTOMATED SYNTHESIS OF CHEMICAL COMPOUNDS

BACKGROUND OF THE INVENTION

The production of peptides and other fine chemicals has been greatly simplified by the development of synthesizers which automatically or semi-automatically carry out the step wise addition of reagents, such as amino acids in the case of peptide formation, or fragment coupling reactions. Reagents are transferred from reagent reservoirs to reaction chambers by an inert gas, vacuum or by pumping. However, many of the machines that are presently available for carrying out such a syntheses are limited to the production of a single peptide or single chemical at a time.

Apparatus capable of carrying out the syntheses of a number of different peptides is described in the U.S. Pat. No. 4,746,490 issued May 24, 1988 to Hossain Saneii. This patent describes a solid phase peptide synthesizer which comprises a plurality of reagent vessels which are in fluid communication with one or more reaction vessels and which includes a plurality of supply valves which are arranged in series to define a line for supplying successive reagents to the reaction vessel. In operation the valves are activated in a given sequence to permit the delivery of various reagents to the reaction vessels by nitrogen gas under pressure. Although well suited for its purpose, the reliance on the plurality of supply valves raises the cost of manufacture of the machine and increases the frequency and complexity of maintenance.

Accordingly it would be highly desirable to provide a synthesizer which is highly flexible that is capable of producing a number of different syntheses of the same or different compounds without the necessity of a complicated valve system and that is less expensive to manufacture and that requires less maintenance.

SUMMARY OF THE INVENTION

Apparatus is described for the automated synthesis of chemical compounds in which a housing includes at least one robotic arm carrying a vertically moveable probe for travel over a reaction table to acquire and dispense reagents at precise locations on the table. A programmable controller allows for carrying out a single synthesis at multiple locations on the table or for carrying out multiple synthesis protocols at multiple locations on the reaction table.

In accordance with the invention there is provided a valveless reaction block for such apparatus. The block is adapted to rest on the reaction table of the apparatus and is provided with a multiplicity of reaction wells which open to the upper surface of the block for receiving reagents from the probe. The reaction wells communicate with discharge conduits in a manifold section of the reaction block by means of a flushing conduit for flushing the reaction wells responsive to a pressure differential created between the reaction wells and the discharge conduits. The pressure differential may be created by use of a pressurized inert fluid, such as, for example, nitrogen, or by the drawing of a reduced pressure in the discharge conduits. The inert fluid may also be used to create an inert atmosphere within the reaction wells. The wells are flushed by controllably creating the pressure differential responsive to the command of the controller.

In one embodiment of the invention, the manifold portion of the reaction block is located at the upper portion of the reaction block and the flushing conduits discharge at the top of the reaction block. Temperature control within the reaction wells is achieved by a thermally conductive plate in heat transfer with the lower surface of the reaction block. To improve heat transfer to the reaction wells, heat transfer pins extend from the plate into the reaction block in surrounding relationship to each of the reaction wells.

In another embodiment of the invention, the flushing conduit of each reaction well discharges into a corresponding duct located adjacent the reaction well. The duct communicates with the manifold section which is formed in the lower portion of the reaction block. In this embodiment, the manifold section is preferably formed as an integral part of the reaction block and also serves as the temperature controller for the reaction wells. The heat exchange pins extend from the manifold section in surrounding relationship to the reaction wells as described above.

The invention will be more fully understood from the following detailed description taken in conjunction with the drawings briefly described below.

DETAILED DESCRIPTION OF THE INVENTION

Figure 1:
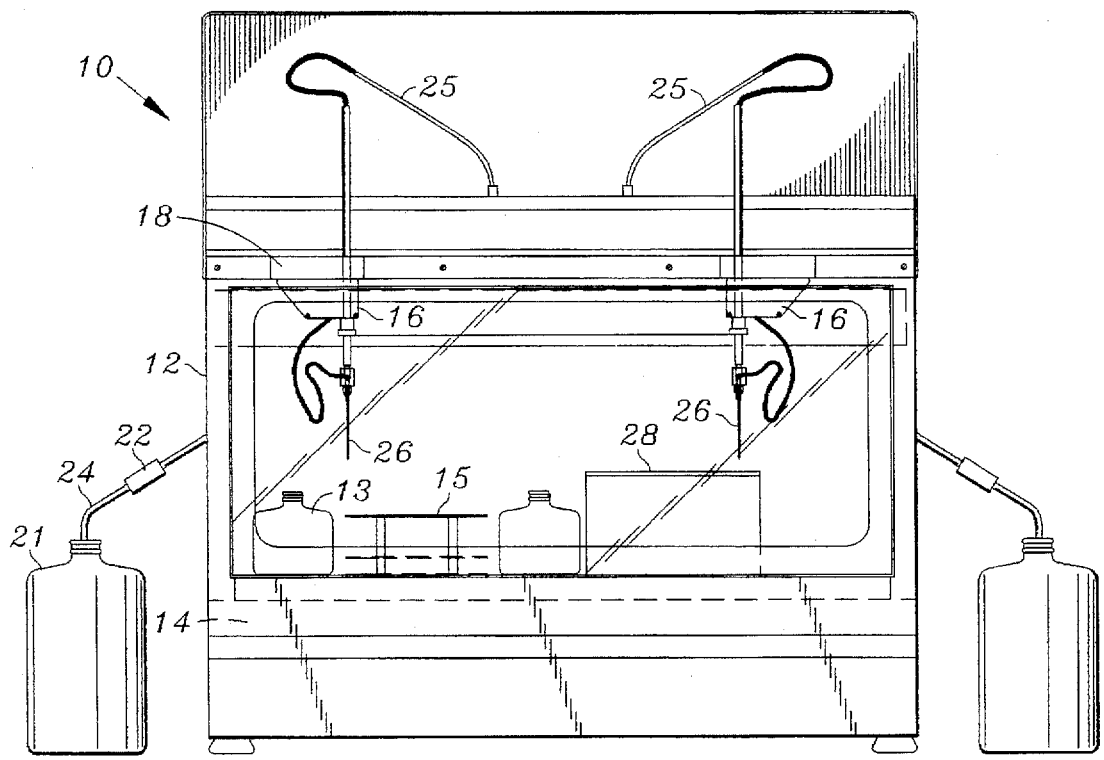
FIG. 1 is a schematic front view of the apparatus of the present invention.

Referring to FIG. 1, there is shown an apparatus 10 constructed in accordance with the present invention. The apparatus 10 comprises a housing 12, defining front, rear and side walls, surrounding and enclosing a reaction table 14. the reaction table 14 illustrated is set for an amino acid synthesis and includes reagent bottles 13, an amino acid rack 15 and at least one reaction block 28 in which the synthesis is carried out. The particular arrangement of the reaction table 14 is not critical and depends upon the type of reaction being carried out. All fluid pickup and aspiration is performed hydraulically using non-compressive system fluids in the lines as the hydraulic media. This assures accurate reagent transfer quantities. As shown schematically in FIG. 3, the system fluid containers 21 are most conveniently located outside of the housing and are connected to electrically controlled syringes 22 by lines 24. Pairs of lines 25 communicate between the syringes 22 and probes 26 through a junction 27. In the embodiment illustrated, each probe can receive two different system fluids making available a total of four different system fluids. By increasing the number of syringes 22, the number of available system fluids can be increased. For amino acid synthesis, however, the availability of four different system fluids is sufficient.

A pair of perpendicularly extending arms 16 are slidably carried by a track 18 mounted on the rear wall of the housing 12 for movement of the arms longitudinally over the reaction table 14 along the track responsive to commands from a controller (not shown). Each of the arms 16 defines a channel 16' in which is vertically reciprocally moveable mounted a probe 26 for movement in the channel laterally over the reaction table 14. The probes 26, in combination with the track 18 and arm 16 serve to robotically pick up and aspirate reagents, system fluids and reaction products responsive to programmed commands from the controller.

The reaction table 14 carries at least one reaction block 28 in which is disposed a multiplicity of reaction wells 30. The reaction table 14 is provided with an orbital mixer 58 for reciprocal or orbital motion for mixing of the contents of the wells 30 and means are provided in the reaction block 28, as will be discussed in more detail below, for emptying the wells 30 responsive to a command from the controller.

In accordance with the invention the reaction block 28 is valveless and consists of two designs, bottom emptying and top emptying. The selection of a particular design of reaction block 28 is a matter of choice and equivalent results are obtained with either of the block designs.

Figure 4:
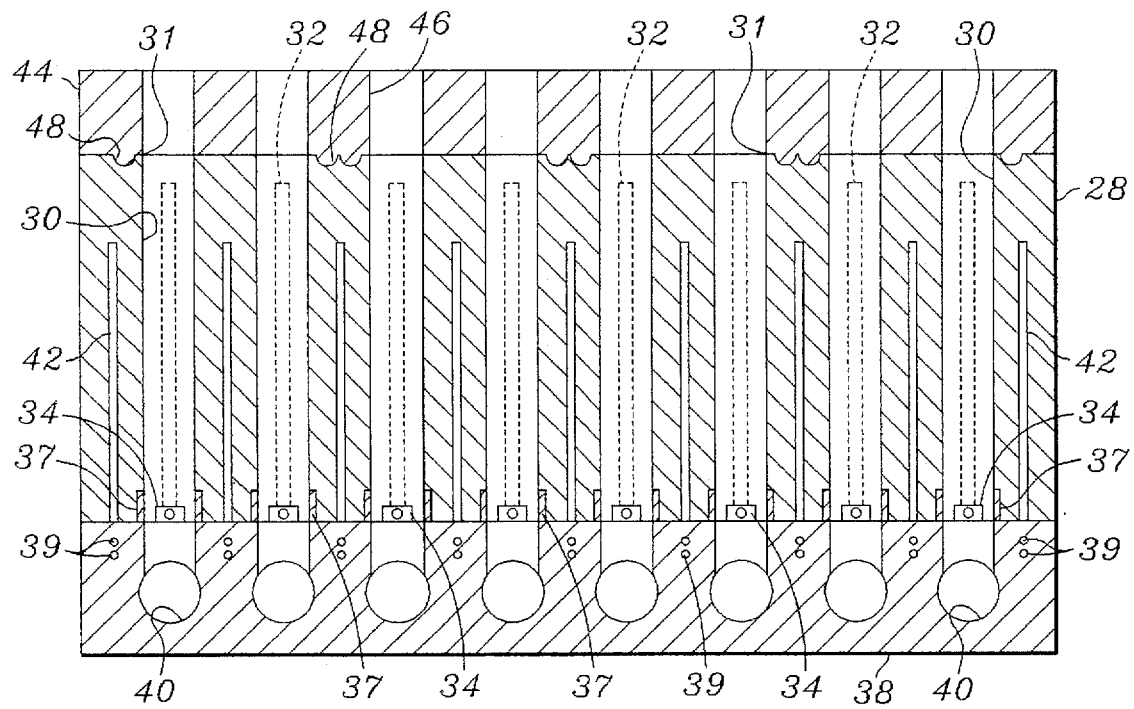
FIG. 4 is an end section of a bottom emptying reaction block used for the apparatus of FIG. 1.
Figure 5:
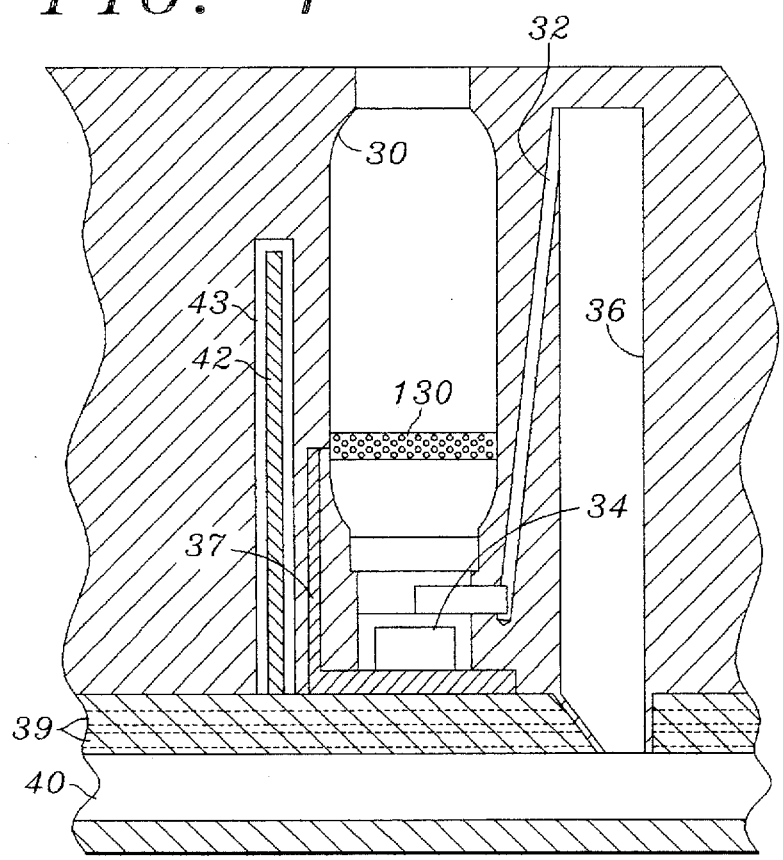
FIG. 5 is a side sectional view of a portion of the bottom emptying reaction block of FIG. 4 in enlarged scale and partially broken away for compactness of illustration.
Figure 6:
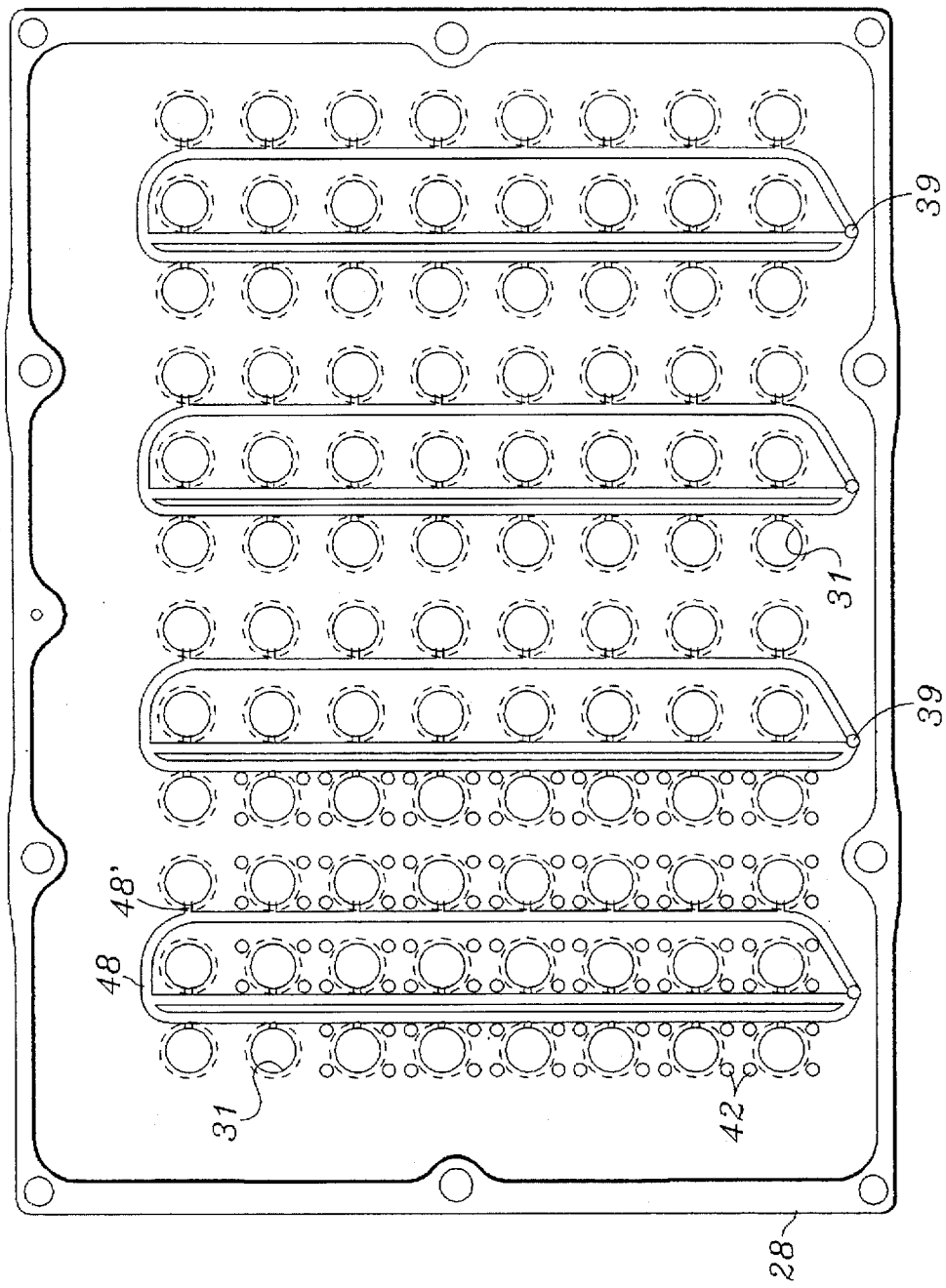
FIG. 6 is a top plan view of the of the reaction block of FIG. 4.

In the embodiment of the invention shown in FIGS. 4, 5 and 6, the reaction block 28 is of the bottom emptying design. The reaction block 28 illustrated includes ninety six reaction wells 30 which are arranged in 12 rows of 8 wells each. It will be understood, however, that depending upon the scale of the apparatus 10, the reaction block 28 may include a greater or fewer number of reaction wells 30 arranged in any configuration. In addition, more than one reaction block 28 may be carried on the reaction table 14.

The mouths 31 of each of the wells 30 open to the upper surface of the reaction block 28 for introduction of reagents, system fluids and the like. The mouth 31 of each of the wells 30 is sealed by a self sealing septum (not shown) penetrable by the probe 26 as is well understood in the art. The wells 30 are closed at their bottom ends and a filter 130 is disposed in the lower end of the well 30 for retention of any solid phase material. A flushing conduit 32 is provided in the reaction block 28 immediately adjacent each of the wells 30. The flushing conduit 32 is preferably disposed at a slight angle (between about 2° to about 10°) with respect to the vertical axis of the well 30. A preferred orientation is an angle of 8° with respect to the vertical axis of the well 30. The flushing conduits 32 communicate at their lower ends with an adjacent well 30 through an undercut 34 provided in the bottom of the well 30. In addition, the flushing conduit 32 communicates at its upper end with a duct 36 having a larger diameter than the conduit 32 to prevent uncontrolled siphoning from the reaction wells 30. The duct 36 is closed at its upper end and is open to the lower surface of the reaction block 28. As is most clearly shown in FIG. 1, a pair of wash conduits 27 are also located in the reaction block 28 and they open to the lower surface of the block for washing the probe 26 prior to and during a synthesis protocol.

The lower portion of the reaction block 30 defines a manifold 38. The manifold 38 is provided with a plurality of waste conduits 40 which communicate with the lower ends of the waste ducts 36 for leading the contents of the reaction wells 30 out of the reaction block 28 for subsequent processing, product recovery and waste reagent disposal.

Flushing of the wells 30 is achieved by creating a pressure differential between the reaction well and the ducts 36 such as by applying positive pressure on the reaction well by means of an fluid which is inert with respect to the contents of the well 30 or by connecting the manifold 38 to suitable means, such as a vacuum pump, for reducing the pressure in the ducts 36 to create reduced pressure in the manifold. In either case, the contents of the reaction well 30 are caused to flow through the undercut 34 and the flushing conduit 32 to the duct 36 due to the pressure differential. Although essentially nonreactive gasses, such as nitrogen, helium and argon are preferred, nitrogen being most highly preferred, as the inert fluid, it will be understood that any fluid, liquid or gaseous, which is nonreactive with the contents of the reaction wells 30 may be utilized as the inert fluid within the scope of this invention.

The manifold 38 also serves as the temperature control means for controlling the reaction temperature in the reaction wells 30. Accordingly it is preferred that the reaction block 30, or at least the lower portion defining the manifold 38 be formed from a thermally conductive material, such as an aluminum alloy, that is inert or resistant to the reagents thereof employed in the reaction and which has good thermal conductivity for conducting heat to and from the reaction block 28 to a thermal carrying fluid, such as nitrogen or other inert gas, which is caused to flow through passages 39 in the manifold.

The reaction wells 30 are surrounded by heat exchange pins 42 which extend from the manifold 38 into corresponding blind sockets 43 formed the reaction block 28. In the embodiment illustrated the heat exchange pins 42 are arranged in groups of 4 in surrounding relationship to each reaction well 30. The heat exchange pins 42 serve to assist in both heating and cooling the reaction wells 30. In addition it is preferred that the lower portion of each reaction wells 30 sit in a heat conductive cup 37 which partially surrounds the lower portion of the well. The wall of the cup is cut away for the flushing conduit 32.

As mentioned above, it is highly preferred to use an inert gas such as nitrogen as the heating or cooling fluid for the manifold 38. The inert gas may also be used to create a positive pressure in the reaction well 30 during the flushing operation and also to provide an inert atmosphere within the housing 12 to protect the reaction and reaction products. By use of an inert gas such as nitrogen, reactions may be carried out from as low as minus 70 xC up to 150 xC. It will be understood, however, that other heating and cooling means may be employed such as, for example, an electric heating coil in the manifold or heating and cooling piezoelectrically.

The wells 30 are surrounded by septum conduits 48 for delivery of the inert gas to create a positive pressure and/or an inert atmosphere. In the embodiment illustrated in FIG. 6, the passages 39 extend up through the reaction block 28 and open to the septum conduits 48 formed on the upper surface of the block and which extend between the rows of wells 30. Connector grooves 48' connect the mouths 31 of the wells 30 with an adjacent septum conduit 48 to provide a flow path for the inert gas into the well to create an inert atmosphere and a positive pressure for flushing the well.

The block assembly is completed by a top plate 44 which closes the upper portions of the septum conduits 48 and the connector conduits 48'. The top plate 44 is provided with a plurality of openings 46 which correspond to and are aligned with the openings 31 of the reaction wells 30 in the upper surface of the reaction block 28. By providing a lip (not shown) around the top plate 44 the reaction block 28 is adapted for "flood" filling. That is, the wells 30 may be simultaneously filled by flooding the top plate, for example with a solvent or system fluid. Flood filling is particularly time saving when cleaning a reaction block 30 between synthesis. It will be understood that other embodiments of the reaction block, such as described below in conjunction with FIGS. 7–9, can also be adapted for flood filling in the same manner.

The wells 30 in a reaction block 28 may be arranged in groups, referred to as racks, or all of the wells of a single reaction block may form a rack. Individual racks may be utilized for reactions or for containment of reagents or other procedures involved in the synthesis being carried out, such as a cleavage operation in the case of peptide synthesis. The arrangement of the wells 30 in the reaction block 28 is not critical and the apparatus of the invention can be programmed to work with a reaction block of any number and configuration of wells Referring to FIGS. 7, 8 and 9, in which like reference numbers refer to like parts having like function, there is illustrated another embodiment of the apparatus 10 in which the reaction block 28 is designed as a top emptying block, that is emptied from the top or upper surface. The reaction block 28 is provided with reaction wells 30 which are arranged as described above. A flushing conduit 32 is provided in the block adjacent each of the reaction wells 30. The flushing conduit 32 communicates with the reaction well 30 through the undercut 34 in the fashion described above. In this embodiment, however, the flushing conduits 32 open at 32' to channels 52 formed in the upper portion of the reaction block 28.

The upper portion 49 of the reaction block 28 defines a manifold formed by the channels 52 which intersect with a waste channel 54 on each side of the block. The waste channels 54 communicate with an exhaust duct 36 located at diagonally opposite corners of the reaction block 28. The channels 52 as shown, run laterally between rows of the reagent wells 30 while the waste channels 54 extend longitudinally through the upper portion of either side of the reaction block 28. It will be understood that the channels 52 may extend both longitudinally and laterally between the openings 31 of the reagent wells and feed into waste channels 54 which are disposed on all four sides of the reaction block 28.

In this embodiment of the invention, a temperature control plate 41 is affixed to the reaction table 14 rather than directly to the reaction block 28 and is contiguous to the lower surface of the reaction block for the transfer of thermal energy therebetween. The heat exchange pins 42 extend from the manifold and are received in the sockets 43 in the reaction block 28 in surrounding relationship to each reaction well 30 in the manner described in connection with the block illustrated in FIG. 3. Preferably a thermally conductive sheet 45 is disposed on the lower surface of the reaction block 28 to eliminate any air gap which may be formed between the block and the temperature control plate 41. The temperature control plate 41 in the embodiment illustrated is a plate formed of thermally conductive material with passages 39 for conveying a heating or cooling fluid through the block to heat and cool the reaction wells 28. The heat exchange pins extend into the reaction block 28 in the manner and for the purpose already explained above. As pointed out above, in addition to the use of a thermal conduction fluid, other heating and cooling means such as heating coils or piezoelectric heating and cooling devices may be employed to control the reaction temperatures in the wells 30.

The operation of the apparatus 10 is under the direction of the controller which may be dedicated to a single reaction or, more preferably, is a computer containing software which can be programmed by the user for controlling and carrying out various reactions. In the embodiments illustrated and described herein, the controller is a personal computer containing a program which lays out the reaction steps and controls the movement and position of the arms 16 and the probe 26. In addition, the program sets and controls the reaction temperatures.

Figure 3:
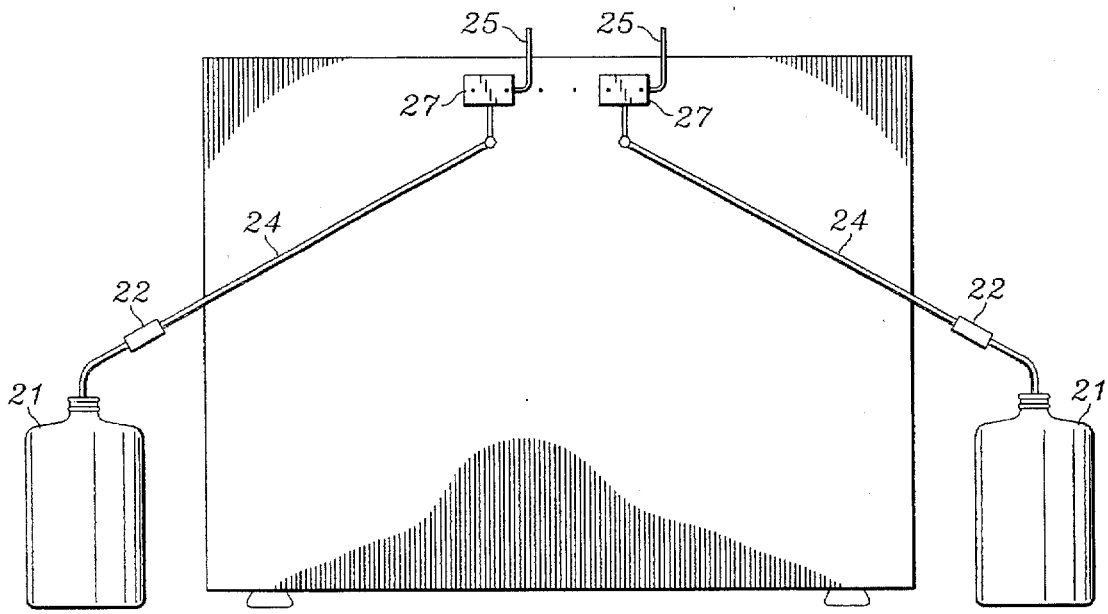
FIG. 3 is a schematic rear view of the apparatus of FIG. 1 illustrating fluid flow from the system fluid containers.
Figure 2:
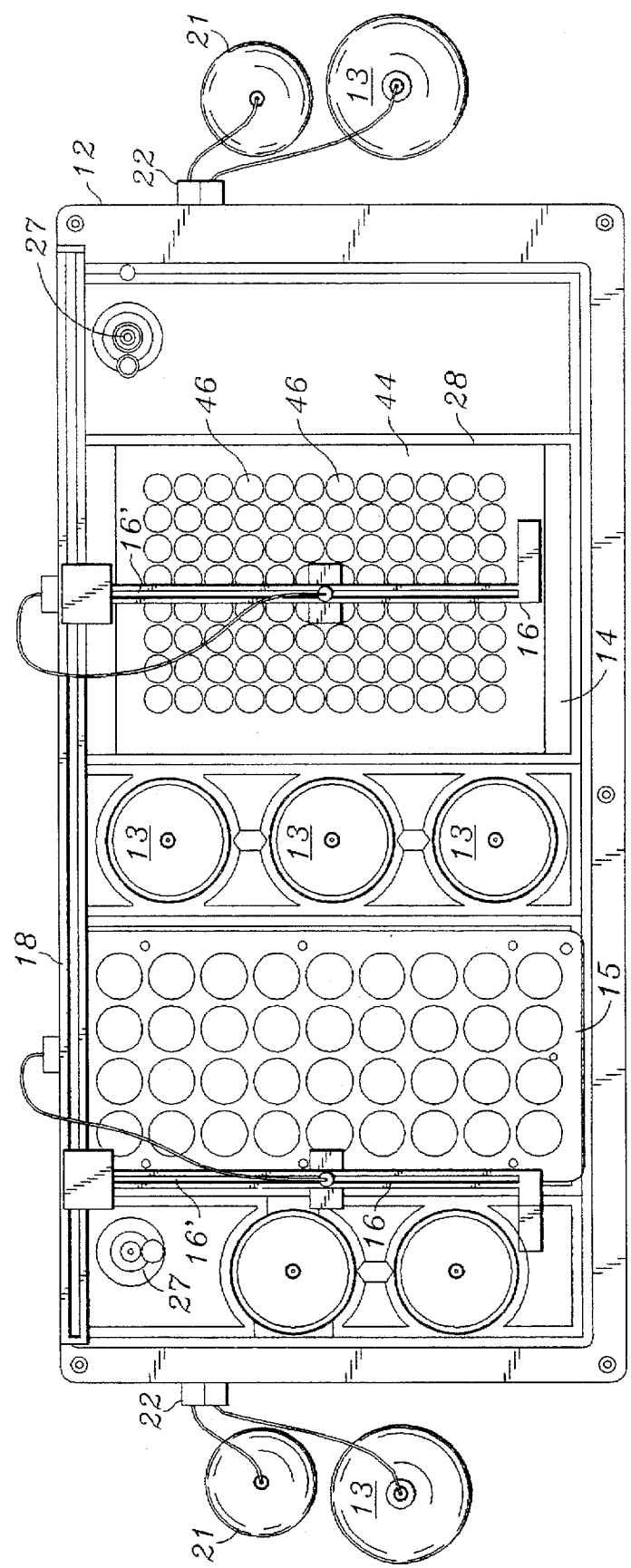
FIG. 2 is a schematic top plan view of reaction table of the apparatus of FIG. 1.
Figure 7:
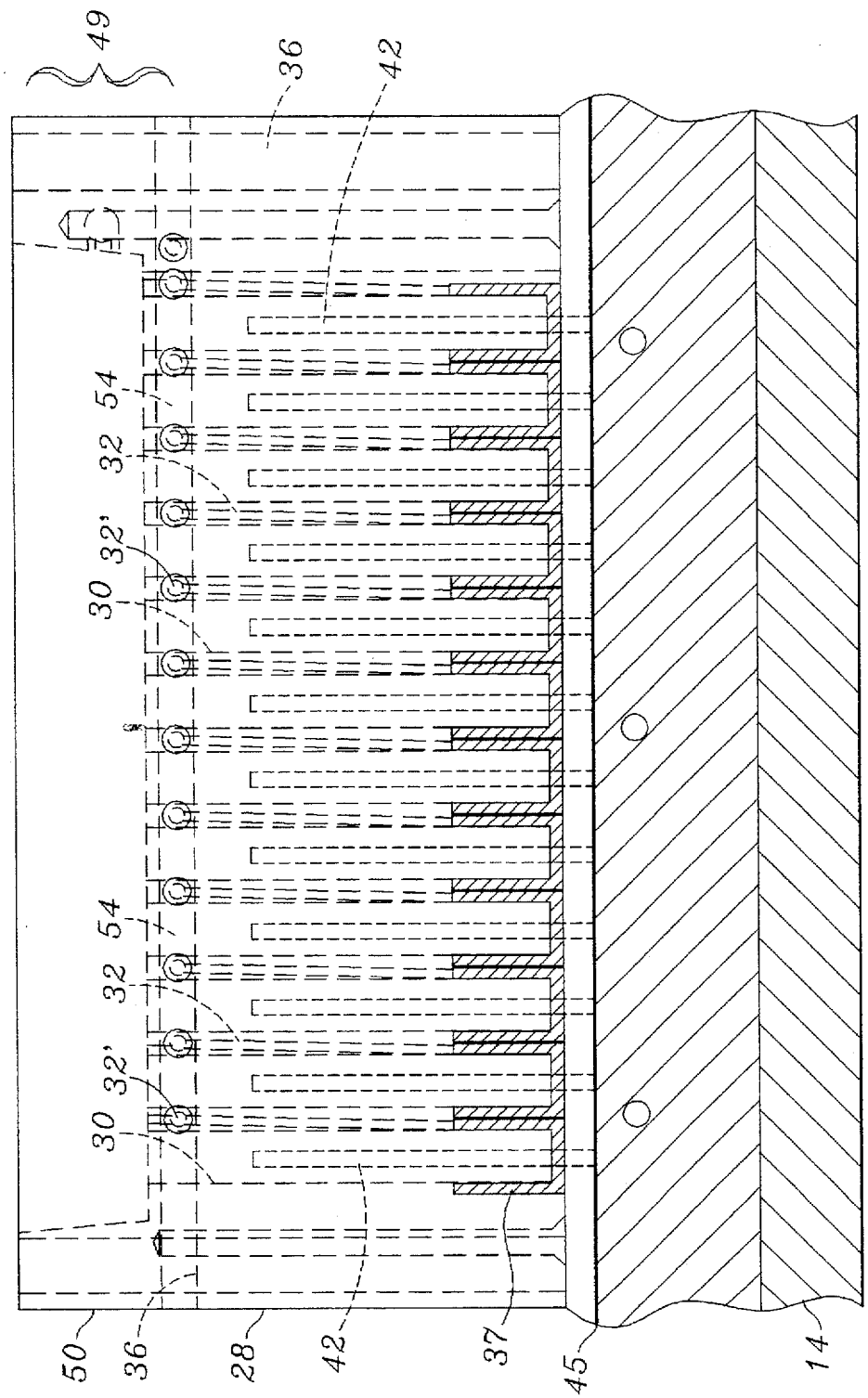
FIG. 7 is a side section of a top emptying block.
Figure 8:
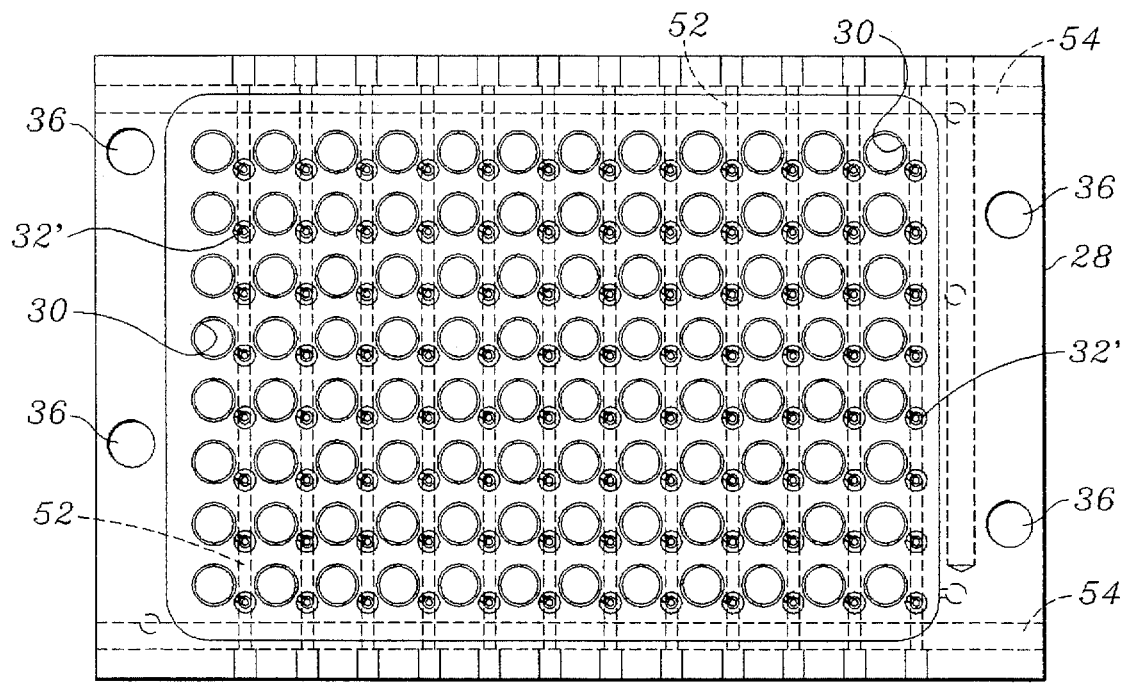
FIG. 8 is a top plan view of the block of FIG. 7.
Figure 9:
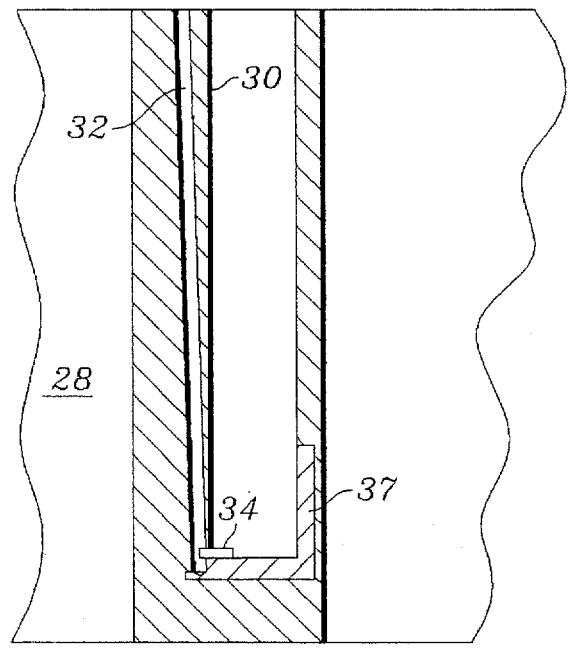
FIG. 9 is a side sectional view, partially in section and partially broken away for compactness of illustration, of a portion of the top emptying block of FIG. 7 in enlarged scale.

As pointed out above, the operation and function of the apparatus 10 equipped with the bottom emptying reaction block 28 illustrated in FIGS. 3, 4 and 5 or the top emptying reaction block 28 illustrated in FIGS. 6, 7 and 8 is the same. In the following description the reaction block 28 is assumed to be the top emptying type illustrated in FIGS. 3, 4 and 5.

EXAMPLE 1

The operation of the apparatus 10 will be more fully illustrated in conjunction with the following example which is a general description of the preparation of a generic P-AA(1)-AA(0)-Resin in which P is a protecting group, AA is an amino acid, and the resin is chloromethylated polystyrene divinylbenzene (Merrifield peptide resin) or any other polymeric resin.

The steps of the operation are directed by the controller which is programmed to carry out the particular protocol. The reaction table 14 is organized into a monomer and reagent rack and a reaction rack consisting of a reaction block 28, as described above in connection with FIGS. 7, 8 and 9, containing 96 reaction wells 30. The reaction rack need not include all 96 of the reaction wells 30 and it should be clear that a different peptide resin protocol can be carried out in each of the individual reaction wells. For convenience of description, however, in this Example 1 all 96 of the reaction wells 30 are employed and the same peptide resin protocol is being carried out in all of the reaction wells. The reaction wells 30 are emptied by introducing nitrogen gas to the mouths of the wells to create the pressure differential and flush the wells.

The reagent rack is defined by thirty six 45 ML polypropylene bottles which are adapted to store monomer under nitrogen and five 450 ML bottles for containing activating and coupling reagents used in the solid phase synthesis of Peptides as well known in the peptide art. System fluid chemicals are maintained in 4 liter containers which are located externally of the apparatus 10 and which communicate with the valves 22 through the lines 24. In the embodiment under discussion the temperature control plate 41 is electrically heated and reactions may be carried out at room temperature and above.

The resin is placed in the wells 30 in which the peptide is to be formed. The x and y coordinates of the first and last reaction well 30 in the rack are input to the controller for setting the positions of the arms 16. Intermediate positions of the wells 28 are calculated by the controller. Likewise the coordinates of the reagent containers, the reagent dispensing sequence, the temperature settings, washing and flushing steps, and specific solvents and the like to be used are also input into the controller and typically these are preprogrammed protocols for the particular peptide being produced. With this information the controller is prepared to direct the following method steps:

1. Prewash Lines. Sequentially the arms 16 are positioned over a washing conduit 27. Valve 25 in the line 24 between the solvent/dilution container and the syringe 22 is opened and the syringe 22 activated to draw the system fluid through the line 24, valve 25 and probe 26 for discharge into the wash conduit 56. This step is repeated for each of the syringes 22 and probes 26.

2. Resin Wash. The starting resin, which contains a single protected amino acid monomer, is subjected to several washing steps. In each step the arm 16 is moved over the opening 46 in the top plate 44 which communicates with the interior of a selected well 30 through its mouth 31 and the probe is inserted into the well. The valve 27 to the appropriate system fluid to be used as the washing solvent is opened and the syringe 22 draws the appropriate amount of system fluid for discharge into the reaction well. This is repeated for each of the reaction wells 30 containing the starting resin material. The orbital mixer 58 is activated to thoroughly mix the resin and system fluid for a desired period of time. Upon completion of the mixing period, nitrogen is led from a source of the gas and is introduced into the reaction block 28 adjacent the well mouth 31 through the septum conduits 48 to create a positive pressure in the well which flushes the liquid out of the well through the undercut 34 to the waste conduit 36. The resin washing step will be repeated several times and a different system fluid may be employed for each washing step.

3. Line Wash. Step 1 is repeated.

4. Deprotection. The protecting group of the amino acid monomer is chemically removed by a deprotecting agent in accordance with standard practice to make the amino acid available for coupling to the amino acid AA(1). The proper quantity of deprotecting agent is drawn by the probe 26 responsive to the action of the syringe 22 from a container in the reagent rack. The arm 16 is then moved responsive to the command of the controller over the reagent well 30 and the syringe 22 is operated to dispense the deprotecting agent through the probe 26 into the well. This step is repeated for each of the reaction wells 30 containing an amino acid to be deprotected. The orbital mixer 58 is activated to thoroughly mix the deprotecting agent and resin for a defined period of time. Nitrogen gas is introduced to pressurize the well 30 to flush the liquid reaction products and excess deprotecting agent from the well.

5. Line Wash. The line wash Step 1 is repeated to clear the syringe 22 and probe 26.

6. Coupling. At this point the AA(0)—Resin product will couple with the amino acid AA(1). At least one of the arms 16 is directed to the monomer rack and the probe inserted into a monomer container. The syringe 22 is activated to draw the proper amount of monomer into the probe and the arm 16 is directed to a reaction well 30 and the amino acid is dispensed therein. A coupling reagent is also transferred from the reagent rack to the reaction well 30 and the orbital mixer 58 is activated and the contents of the reaction wells 30 are mixed for a defined period of time. After mixing the resin is washed as in the manner described in Step 2. After coupling, the reaction product may be further treated such as being subjected to a cleaving operation to separate the coupled amino acids from the resin.

EXAMPLE 2

The apparatus of Example 1 was used to carry out a series of different solid phase reactions to synthesize biphenylalanine, a constituent of several biologically active peptides such as the antibiotic WS-43708A and angiotensen II antagonists. The reaction block was as described in connection with FIGS. 7, 8 and 9 and nitrogen was used to create a positive pressure in the reaction wells 30 to flush the wells.

In this example 40 wells of the reaction block 28 were used to carry out the synthesis. The reagent rack was defined by five 45 ML polypropylene bottles which are adapted to store monomer under nitrogen. The following five monomers, identified as Monomer 1 through Monomer 5 were employed in the synthesis:

Monomer 1=phenylboronic acid
Monomer 2=Triethylamine (TEA)
Monomer 3=4-dimethylaminopyradine (DMAP)
Monomer 4=diisopropylethylamine (DIPEA)
Monomer 5=tetrakis(triphenylphosphine) palladium (0)

The system fluids (sequence solvents) consisted of toluene, dimethylformamide (DMF), dimethylsulfoxide (DMSO), dimethylamine (DMA), and 1,2-dichlorobenzene. The solvents were maintained in external 4 liter containers which communicate with the valves 22 through the lines 24. In this example wells 1–20 contained Boc-Tyr(Tf) resin and wells 21–40 contained Boc-Phe(4-1) resin.

The x and y coordinates of the first and last reaction well 30 in the rack were input to the controller 20 for setting the positions of the arms 16. As described in Example 1, the intermediate positions of the wells 28 were calculated by the controller 20. Likewise the coordinates of the reagent containers, the reagent dispensing sequence, the temperature settings, washing and flushing steps, and specific solvents and the like to be used are also input into the controller 20. Once so programmed, the controller 20 directed the following synthesis sequence:

1. Prewash. Sequentially the arms 16 are positioned over a washing conduit 27. Valve 25 in the line 24 between the solvent/dilution container and the syringe 22 is opened and the syringe 22 activated to draw the system fluid through the line 24, valve 25 and probe 26 for discharge into the wash conduit 56. This step is repeated for each of the syringes 22 and probes 26.

2. Resin Wash. One ml of each of the sequence solvents were dispensed to each of the forty wells using DMF as the hydraulic medium. The orbital mixer 58 is activated to thoroughly mix the resin and sequence solvents for 30 seconds at 900 RPM. The wells were flushed using nitrogen to create a pressure differential in the wells. Flushing was carried out for 3 minutes.

3. Transfer monomers. Monomer 1(219 ul) was transferred to each of the forty wells. Monomer 2(73 ul) was transferred to wells 1–5 and wells 21–25. Monomer 3(364 ul) was transferred to wells 6–10 and wells 26–30. Monomer 4(364 ul) was transferred to wells 11–15 and wells 31–35. In all cases DMF was the hydraulic medium. Between each of the monomer transfer steps the washing procedure of step 1 was carried out. Wells 16–20 and 36–40 received no monomer and were designated as control wells.

4. Heat wells. The electrically heated temperature control plate 41 is activated and the temperature is set to 90 xC. Once the temperature reaches the setpoint the orbital mixer is activated to mix the contents of the wells for 3 minutes at 900 RPM.

5. Add catalyst. Monomer 5(73 ul), the reaction catalyst, was transferred to each of the wells 1–40. The contents of the wells was mixed for 4 hours at 900 RPM at the set temperature of 90 xC. At the end of the 4 hour period the orbital mixer and temperature control plate 41 were deactivated and the reaction block was allowed to gradually cool for 1 hour. The wells were flushed to remove remaining liquid. The reaction product was attached to the resin substrate.

6. Cleavage from resin. The reaction product was removed from the resin using aqueous sodium methoxide as the cleaving agent in accordance with standard protocol. The liquid product was aspirated from each well and dispensed into individual containers for additional purification and analysis.

7. Final wash. The wells were washed in the following sequence. DMF, methanol, citric acid and deionized water. In each case the wash solution was dispensed into the wells and the orbital mixer activated for 3 minutes at 900 RPM and the wells were flushed for 3 minutes.

EXAMPLE 3

The following demonstrates use of the apparatus containing the reaction block described in connection with FIGS. 4 and 5 for solution phase synthesis of a-phenylethyl alcohol by the Grignard reaction between ethylene oxide and phenylmagnesium bromide.

The reaction table 14 included a reagent rack consisting of three 45 ML polypropylene reagent bottles. One bottle contained a one molar diethyl ether solution of ethylene oxide maintained in an ice bath. A second 45 ml polypropylene bottle contained a one molar diethyl ether solution of phenylmagnesium bromide. The third bottle contained a 3 molar solution of hydrochloric acid. The system fluids included chloroform and dimethylformamide on arm one, and methanol, and dichloroethane on arm two. The reaction block was defined as a 9 by 12 matrix of individual reaction wells on a solid Teflon block. Maximum penetration (Z-max) of the probe in the wells was programmed to be one millimeter above the bottom of the wells.

Step 1. 0.25 ml of ethylene oxide was distributed to individual reaction wells corresponding to numbers 1–48 using the probe of arm one.

Step 2. The reaction block was cooled to 0 xC using nitrogen as the cooling fluid.

Step 3. 0.25 ml of phenyl magnesium bromide was distributed reaction wells 1–48 by the probe of arm 2.

Step 4. Sequentially the arms one and 2 were positioned over a washing conduit. Valve 25 in the line 24 between the system fluid container and the syringe 22 is opened and the syringe 22 activated to draw the system fluid through the line 24, valve 25 and probe 26 for discharge into the wash conduit 56. This step is repeated for each of the syringes 22 and probes 26.

Step 5. The orbital mixer was activated to mix the contents of the wells for a period of four hours at 900 rpm.

Step 6. Mixing was stopped and 0.25 ml of hydrochloric acid, followed by 0.75 ml Chloroform was distributed to the reaction wells by arm one.

Step 7. The orbital mixer was activated for 5 minutes and the reaction block allowed to stand for 5 minutes to allow the layers to separate.

Step 8. The probe of arm one was sequentially sent to Z-max in reaction wells 1–48 and 0.5 ml was correspondingly transferred to wells 49–96.

Step 9. Another 0.5 ml of chloroform was distributed to reaction vessels one through forty eight.

Step 10. Steps 7 through 9 were repeated twice.

Step 11. The wells were flushed directly into a rack consisting of a block containing seats for 96 bottles corresponding in position to the discharge ducts of the wells of the reaction block. Nitrogen was used to create a positive pressure for flushing the wells. Bottles 1–48 received the acidic aqueous waste from wells 1–48 and bottles 49–96 received a chloroform solution of a-phenylethyl alcohol.

From the foregoing it will be seen that the apparatus of the present invention is highly flexible and is capable of synthesizing a variety of compounds in a single setup or producing a larger quantity of a single compound in the wells. Reproducability and reliability of the synthesis is insured by elimination of manual manipulation once the protocol has been properly entered into the controller. The blocks utilized in the apparatus of the present invention are temperature controlled thus allowing for a wide range of protocols to be carried out. In addition, flushing of the wells is and introduction of reagents is carried out without the necessity of a complex system of valves which substantially reduces the cost of manufacturing and maintaining the apparatus of the invention.

As will be understood by those skilled in the art, various arrangements which lie within the spirit and scope of the invention other than those described in detail in the specification will occur to those persons skilled in the art. It is therefor to be understood that the invention is to be limited only by the claims appended hereto.

Having described the invention I claim:

1. Apparatus for the synthesis of chemical compounds comprising a housing having a top, front, side and rear walls surrounding and enclosing a reaction table, track means on said rear wall of said housing, at least one arm extending perpendicularly from said rear wall over said reaction table and being carried by said track means for movement parallel to said rear wall of said housing, at least one container for a system fluid, at least one reciprocally movable probe depending downwardly from said arm and movably mounted thereon for movement along said arm, at least one control syringe, fluid communication lines between said arm and said control syringe and between said probe and said control syringe, means for programming and controlling the probe and control syringe, the invention comprising;

a. a reaction block comprising a body defining an upper portion and a lower portion and an upper and lower surface, said body having at least one reaction well closed at its lower end and opening to said upper surface,
   b. a flushing conduit located adjacent said well and being in fluid communication therewith;
   c. manifold means in fluid communication with said flushing conduit for leading fluid into and out of said body;
   d. means for closing the opening of said reaction well; and
   e. means for creating a pressure differential between said reaction well and said manifold means;
   whereby reagents are introduced into said reaction well by said probe and the contents of said reaction well are flushed therefrom by creation of a pressure differential between said reaction well and said manifold means responsive to commands from the control means.

2. The apparatus of claim 1 further including a septum conduit in said body, said septum conduit surrounding said reaction well, a connector groove between said septum conduit and the opening of said reaction well for fluid communication therebetween.

3. The apparatus of claim 2 wherein said septum conduit is in fluid communication with a source of inert fluid for creation of an inert atmosphere and positive pressure in said reaction well.

4. The apparatus of claim 3 wherein said inert fluid is an inert gas selected from the group consisting of nitrogen, argon, and helium.

5. The apparatus of claim 1 wherein said manifold means communicates with means for reducing pressure within said manifold thereby to create a pressure differential between said reaction well and said manifold.

6. The apparatus of claim 1 further including a thermally conductive member in heat conductive relationship with said body, means for controllably adjusting the temperature of said member thereby to control the temperature in said reaction wells.

7. The apparatus of claim 6 further including at least a heat exchange pin extending from said manifold into a corresponding socket in said reaction block.

8. The apparatus of claim 7 wherein said heat exchange pins and said corresponding sockets are arranged in groups of four of said pins in surrounding relationship to said reaction well.

9. The apparatus of claim 6 further including a thermally conducting base surrounding at least a portion of said lower end of each said reaction well, said thermally conducting base member being in heat conducting relationship with said thermally conductive member.

10. The apparatus of claim 5 wherein said manifold means comprises a plurality of channels formed in said upper portion of said reaction block, a waste duct formed on each side of said block intersecting said channels, said flushing conduits being in fluid communication with said channels for discharging fluids therein.

11. The apparatus of claim 1 wherein at least one waste conduit extending normal to the axis of said reaction well is formed in said lower portion of said reaction block, a duct communicating with said reaction well by means of said flushing conduit is disposed in said reaction block adjacent to said reaction well, said duct opening to said waste conduit for leading fluids out of said reaction block.

12. The apparatus of claim 1 wherein said lower portion of said reaction block further includes passages in fluid communication with a source of thermally conductive fluid for thermal transfer between said reaction block.

13. The apparatus of claim 1 wherein said flushing conduit extends at an angle with respect to the vertical axis of said adjacent reaction well.

14. The apparatus of claim 1 wherein said reaction block comprises a multiplicity of said reaction wells and said corresponding flushing conduits, each of said reaction wells being accessed by said probe.

15. A valveless reaction block for conducting automated chemical synthesis, said reaction block comprising a solid body defining upper and lower portions and upper and lower surfaces, a multiplicity of elongated reaction wells formed in said body, said reaction wells being closed at their bottom and opening at the opposite end to said upper surface of said body for receiving components of said synthesis, a plurality of conduits formed in said lower portion of said reaction block in fluid communication with at least one suitable external container for removal and disposition of fluids from said reaction block, a multiplicity of ducts defining a closed upper end and communicating at the opposite bottom end with one of said conduits being disposed in said reaction block, one of said ducts being located adjacent one of said reaction wells, a flushing conduit extending between each of said reaction wells and said adjacent duct, said flushing conduit defining a bottom end which opens into the closed bottom of said reaction well and an upper end which opens into the closed upper end of said duct, said flushing conduit being disposed at a slight angle with respect to the vertical axis of said reaction well.

16. The reaction block of claim 15 further including a top plate having a plurality of openings corresponding to said openings of said reaction wells, said top plate cooperating with said upper surface of said to define conduits for leading an inert fluid to said reaction wells, at least a passage in said lower portion of said reaction block in fluid communication with a source of inert fluid and with said conduits.

17. The reaction block of claim 16 wherein said top plate is adapted to receive a liquid for essentially simultanious filling of said reaction wells.

18. The reaction block of claim 15 wherein at least said lower portion of said reaction block is thermally conducting and said reaction block further includes heat exchange pins extending from said lower portion of said reaction block into corresponding sockets in surrounding relationship to each of said reaction wells.

19. The reaction block of claim 18 wherein said heat exchange pins and said corresponding sockets are arranged in groups of four of said heat exchange pins in surrounding relationship to said reaction well.

20. The reaction block of claim 15 wherein said lower portion of said reaction block is thermally conducting and a thermally conducting base member surrounds at least a portion of said lower end of each said reaction well, said thermally conducting base member being in heat conducting relationship with said thermally conductive lower portion of said reaction block.

21. A valveless reaction block for conducting automated chemical synthesis, said reaction block comprising a solid body defining upper and lower portions and upper and lower surfaces, a multiplicity of elongated reaction wells formed in said body, said reaction wells being closed at their bottom and opening at the opposite end to said upper surface of said body for receiving components of said synthesis, a plurality of channels formed in said upper portion of said reaction block in fluid communication with at least one suitable external container for removal and disposition of fluids from said reaction block, a flushing conduit extending between each of said reaction wells and one of said channels in said upper portion of said reaction block, said flushing conduit defining a bottom end which opens into the closed bottom of said reaction well and an upper end which opens into said channel, said flushing conduit being disposed at a slight angle with respect to the vertical axis of said reaction well.

22. The reaction block of claim 21 further including a top plate having a plurality of openings corresponding to said openings of said reaction wells, said top plate cooperating with said upper surface of said to define conduits for leading an inert fluid to said reaction wells, said conduits being in fluid communication with a source of inert fluid.

23. The reaction block of claim 22 wherein said top plate is adapted to receive a liquid for essentially simultanious filling of said reaction wells.

24. The reaction block of claim 21 further including a thermally conductive plate in heat transferring relationship with said lower surface of said reaction block, said plate including a plurality of passages in fluid communication with a source of an inert thermal conveying fluid.

25. The reaction block of claim 21 wherein heat exchange pins extend from said thermally conducting plate into corresponding sockets in said reaction block in surrounding relationship to each of said reaction wells.

26. The reaction block of claim 25 wherein said heat exchange pins and said corresponding sockets are arranged in groups of four of said heat exchange pins in surrounding relationship to said reaction well.

27. The reaction block of claim 21 further including a thermally conductive base member surrounding at least a portion of said lower end of each said reaction well, said thermally conducting base member being in heat conducting relationship with said thermally conductive member.

* * * * *